(12) United States Patent
Love et al.

(10) Patent No.: US 9,370,021 B2
(45) Date of Patent: Jun. 14, 2016

(54) INTERFERENCE REDUCTION FOR TERMINALS OPERATING ON NEIGHBORING BANDS IN WIRELESS COMMUNICATION SYSTEMS

(75) Inventors: Robert T. Love, Barrington, IL (US); Edgar P. Fernandes, Winchester (GB); Vijay Nangia, Algonquin, IL (US); Dale G. Schwent, Schaumburg, IL (US); Kenneth A. Stewart, Grayslake, IL (US); David R. Wilson, Grayslake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 1399 days.

(21) Appl. No.: 12/184,235

(22) Filed: Jul. 31, 2008

(65) Prior Publication Data
US 2010/0029289 A1    Feb. 4, 2010

(51) Int. Cl.
| H04W 4/00 | (2009.01) |
| H04W 74/00 | (2009.01) |
| H04L 5/00 | (2006.01) |
| H04W 72/00 | (2009.01) |
| H04W 16/14 | (2009.01) |

(52) U.S. Cl.
CPC ........... *H04W 74/006* (2013.01); *H04L 5/0041* (2013.01); *H04L 5/0042* (2013.01); *H04L 5/0092* (2013.01); *H04L 5/0066* (2013.01); *H04W 16/14* (2013.01)

(58) Field of Classification Search
USPC .......................................... 370/329; 455/450
See application file for complete search history.

(56) References Cited

U.S. PATENT DOCUMENTS

| 6,532,226 B1 | 3/2003 | Lehtinen et al. |
| 6,594,240 B1 | 7/2003 | Chuah et al. |
| 7,016,333 B1 | 3/2006 | Kokudo |
| 7,940,740 B2 | 5/2011 | Krishnamurthy et al. |
| 2005/0271387 A1* | 12/2005 | Kee et al. ...................... 398/140 |
| 2006/0293060 A1 | 12/2006 | Yang et al. |
| 2007/0173260 A1 | 7/2007 | Love et al. |
| 2007/0173276 A1 | 7/2007 | Love et al. |

(Continued)

FOREIGN PATENT DOCUMENTS

| CN | 1642044 A | 7/2005 |
| CN | 1801800 A | 7/2006 |

(Continued)

OTHER PUBLICATIONS

Sharp "classification of CQI/PMI/rank reporting mechanisms on PUCCH/PUSCH", Nov 5, 2007.*

(Continued)

*Primary Examiner* — Muthuswamy Manoharan
(74) *Attorney, Agent, or Firm* — Faegre Baker Daniels LLP

(57) ABSTRACT

A wireless communication user terminal includes a controller communicably coupled to a transceiver. The controller is configured to tune the transceiver to transmit on a narrowband uplink control channel within a wideband frequency resource. The uplink control channel includes a pair of uplink control channels separated within the wideband frequency resource wherein the pair of uplink control channels are each located within a corresponding PUCCH resource region. The controller is also configured to change a frequency location of at least one of the uplink control channels, within the corresponding PUCCH resource region, away from an edge of the wideband frequency resource.

10 Claims, 8 Drawing Sheets

(56) References Cited

U.S. PATENT DOCUMENTS

| | | | |
|---|---|---|---|
| 2008/0008212 | A1 | 1/2008 | Wang et al. |
| 2008/0025254 | A1 | 1/2008 | Love et al. |
| 2008/0220807 | A1 | 9/2008 | Patel et al. |
| 2008/0240030 | A1 | 10/2008 | Kolding et al. |
| 2008/0280638 | A1* | 11/2008 | Malladi et al. ............... 455/522 |
| 2009/0042601 | A1 | 2/2009 | Wang et al. |
| 2009/0109939 | A1 | 4/2009 | Bhushan et al. |
| 2009/0186625 | A1 | 7/2009 | Qu et al. |
| 2009/0197631 | A1 | 8/2009 | Palanki et al. |
| 2009/0207793 | A1* | 8/2009 | Shen et al. ..................... 370/329 |
| 2009/0227263 | A1 | 9/2009 | Agrawal et al. |
| 2009/0257390 | A1* | 10/2009 | Ji et al. ............................ 370/329 |
| 2009/0262854 | A1* | 10/2009 | Lee et al. ....................... 375/267 |
| 2009/0316842 | A1 | 12/2009 | Lu et al. |
| 2010/0008282 | A1 | 1/2010 | Bhattad et al. |
| 2010/0027484 | A1 | 2/2010 | Imamura et al. |
| 2010/0046595 | A1 | 2/2010 | Sikri et al. |
| 2010/0062783 | A1 | 3/2010 | Luo et al. |
| 2010/0284326 | A1 | 11/2010 | Oh |
| 2011/0110240 | A1* | 5/2011 | Bergquist et al. .......... 370/241.1 |

FOREIGN PATENT DOCUMENTS

| | | |
|---|---|---|
| CN | 1996793 A | 7/2007 |
| CN | 101076182 A | 11/2007 |
| CN | 101156491 A | 4/2008 |
| EP | 1909523 A1 | 4/2008 |
| GB | 2404113 A | 1/2005 |
| JP | 2000-209661 A | 7/2000 |
| RU | 2242091 C2 | 12/2004 |
| WO | 2005-086398 A1 | 9/2005 |
| WO | 2007-039789 A1 | 4/2007 |
| WO | 2007-055619 A1 | 5/2007 |
| WO | 2008039034 A2 | 4/2008 |
| WO | 2008041582 A1 | 4/2008 |
| WO | 2009-026162 A1 | 2/2009 |
| WO | 2009-035983 A1 | 3/2009 |

OTHER PUBLICATIONS

R4-080710; 3GPP TSG RAN WG4 (Radio) Meeting #46bis; Shenzhen, People Republic of China; Mar. 31 to Apr. 4, 2008; 12 Pages.
R4-081112; 3GPP TSG RAN WG4 (Radio) Meeting #46bis; Kansas City, USA; May 5 to May 9, 2008; 10 Pages.
Patent Cooperation Treaty, "PCT Search Report and Written Opinion of the International Searching Authority" for International Application No. PCT/US2010/054690 Feb. 3, 2011, 13 pages.
3GPP TR 36.9xx 0.2.0 (Mar. 2009) 3rd Generation Partnership Project; Technical Specification Group Radio Access Networks; LTE FDD Home eNodeB RF Requirements Work Item Technical Report (Release 9) 24 pages.
Patent Cooperation Treaty, "PCT Invitation to Pay Additional Fees and, Where Applicable, Protest Fees" for International Application No. PCT/US2010/055546 Mar. 15, 2011, 7 pages.
3GPP TSG-RAN WG Meeting #51 bis, R4-092399 "Impact of HeNB interference on paging channel performance" Motorola, Los Angeles, USA Jun. 29-Jul. 2, 2009; 6 pages.
3GPP TSG-RAN WG4 #51, R4-091908 "Partial Bandwidth Control Channel Performance" Qualcomm Europe, San Francisco, USA, May 4-8, 2009, 4 pages.
3GPP TR 25.967 9.0.0 (May 2009) 3rd Generation Partnership Project; Technical Specification Group Radio Access Networks; Home Node B Radio Frequency (RF) Requirements (FDD) (Release 9) 56 pages.
Krishnamurthy et al., "Interference Mitigation in Heterogeneous Wireless Communication Networks" U.S. Appl. No. 12/938,022, filed Nov. 2, 2010.

Krishnamurthy et al., "Interference Reduction for Terminals Operating in Heterogeneous Wireless Communication Networks" U.S. Appl. No. 12/909,043, filed Oct. 21, 2010.
Patent Cooperation Treaty, "Search Report and Written Opinion" for International Application No. PCT/US2010/055546 Jul. 4, 2011, 22 pages.
TSG-RAN Working Group 4 (Radio) Meeting #52, R4-093244 "Downlink Interference Between eNodeB and Home eNodeB" NTT DOCOMO, Shenzhen, Aug. 24-28, 2009, 8 pages.
Xiang Chen et al.: "Coexistence Analysis Involving 3GPP Long Term Evolution", Vehicular Technology Conference, 2007, VTC-2007 Fall, 2007 IEEE 66th, IEEE, PI, Sep. 1, 2007, pp. 225-229.
LG Electronics Inc.: "Efficient Utilization of Unused PUCCH RB", 3GPP Draft; R1-082438 Efficient Utilization of Unused PUCCH RB, 3rd Generation Partnership Project (3GPP), Mobile Competence Centre; 650, Route Des Lucioles; F-06921 Sophia-Antipolis Cedex, France, vol. RAN WG1, no. Warsaw, Poland, Jun. 24, 2008, all pages.
3GPP TSG-RAN WG4 Meeting #52, R4-093220, "Heterogeneous Support for Reliable Downlink Control", Motorola, Shenzhen, China, Aug. 24-29, 2009, all pages.
3GPP TSG-RAN WG1 #54, R1-083195, "Range expansion for efficient support of heterogeneous networks", Qualcomm Europe, Jeju, S. Korea, Aug. 18-22, 2008, all pages.
3GPP TS 36.211 v9.1.0, 3rd Generation partnership Project; Technical Specification Group Radio Access Network; Evolved Universal Terrestrial Radio Access (E-UTRA); Physical Channels and Modulation (Release 9), Mar. 2010), all pages.
Bittermann, Jorg: "The International Search Report and the Written Opinion of the International Searching Authority", European Patent Office, Rijswijk, completed: Dec. 7, 2009, mailed: Dec. 14, 2009, all pages.
Korean Intellectual Property Office, Non-Final Office Action for Korean Patent Application No. 10-2011-7002317 dated Jun. 26, 2012, 4 pages.
United States Patent and Trademark Office "Non-Final Rejection" U.S. Appl. No. 12/938,022 dated Feb. 12, 2012, 11 pages.
Patent Cooperation Treaty, International Search Report and Written Opinion for International Application No. PCT/US2009/049673, mailed Dec. 14, 2009.
Patent Cooperation Treaty, International Search Report and Written Opinion for International Application No. PCT/US2010/036315, mailed Nov. 2, 2010.
The State Intellectual Property Office of the People's Republic of China, Notification of the First Office Action for Chinese Patent Application No. 201080050349.6, mailed Apr. 3, 2014.
The State Intellectual Property Office of the People's Republic of China, Notification of the First Office Action for Chinese Patent Application No. 2009801295873, mailed Apr. 3, 2013.
Russian Federation, Decision on Grant Patent for Invention for Russian Patent Application No. 2011107192, mailed Feb. 28, 2012.
The State Intellectual Property Office of the People's Republic of China, Notification of the Second Office Action for Chinese Patent Application No. 201080050349.6, mailed Feb. 16, 2015.
The State Intellectual Property Office of the People's Republic of China, Notification of the Third Office Action for Chinese Patent Application No. 2010800503496, mailed Oct. 8, 2015.
The State Intellectual Property Office of the People's Republic of China, Notification of the Second Office Action for Chinese Patent Application No. 200980129587.3, mailed Oct. 13, 2013.
Taiwan R.O.C. Patent Office, Office Action for Taiwanese Patent Application No. 098123634, mailed on Mar. 24, 2014.
Taiwan R.O.C. Patent Office, Office Action for Taiwanese Patent Application No. 098123634, mailed on Dec. 3, 2014.
European Patent Office, Office Action for European Patent Application No. 09790072.4, mailed Jan. 29, 2016.

* cited by examiner

| MRP (dB) | MIN OFFSET (#PRBs) | LENGTH (#PRBs) |
|---|---|---|
| 20 | 14 | 11-30 |
| 6 | 0 | 1 |
| 5 | 0 | 2-3 |
| 4 | 0 | 4-6 |
| 4 | 5 | 7 |
| 4 | 10 | 8-9 |
| 5 | 10 | 10 |
| 3 | 11 | 10 |
| 0 | 13 | 1-10 |
| 0 | 20 | 11-14 |
| 0 | 25 | 15-16 |

*FIG. 8*

INTERFERENCE REDUCTION FOR TERMINALS OPERATING ON NEIGHBORING BANDS IN WIRELESS COMMUNICATION SYSTEMS

FIELD OF THE DISCLOSURE

The present disclosure relates generally to wireless communications and more particularly to interference reduction and control for neighboring operating bands in wireless communication systems.

BACKGROUND

In some wireless communication systems, neighboring channels or operating bands fall within a duplex filter RF pass-band or transition band of a communication device resulting in signal interference at the device. In FIG. 1, for example, there is only a 5 MHz guard band between the EUTRA Band 33 TDD uplink/downlink (UL/DL) and EUTRA Band 1 FDD UL. There is only a 2 MHz guard band between the Public Safety (PS) narrowband (NB) downlink (DL) frequency band and the EUTRA Band 13 FDD uplink (UL). Similarly, there is potentially only a 5 MHz guard band between the Band 7 FDD UL and the Band 38 TDD UL/DL depending in the specific regulatory and UMTS extension band auction outcomes. Thus a EUTRA UE transmission may interfere with public safety equipment or another EUTRA UE reception operating on a neighboring band, or with UMTS equipment etc.

FIG. 2 illustrates transmissions by user equipment (UE) that adversely affects a co-located UE operating on a neighboring band. For example, the UE may be a EUTRA UE interfering with another EUTRA UE or a UE operating on the public safety band as discussed above. UE transmission interference with neighboring frequency bands depends generally on the output power of the UE, the transmit bandwidth and on the location of the transmit frequency relative to the neighboring band. For example, control channels implemented using narrowband frequency resources located toward the edges of a wideband frequency resource tend to interfere with neighboring bands, particularly at higher transmit power levels. In EUTRA, the PUCCH control channel is located near or at opposite edges of a wideband frequency resource to provide diversity and to avoid fragmentation of the resource block allocation space used for data traffic transmissions. More generally, interference on adjacent bands may also result from spurious emissions due to frequency domain images generated by radio frequency (RF) impairments such as quadrature (I/Q) imbalance imperfections, local oscillator leakage and DC component feed-through, and the associated inter-modulation products (typically 3rd order, but other inter-modulation orders are possible) that fall within the RF pass-band or transition band of the duplex filter.

FIG. 3 illustrates a spectrum model for a 10 MHz EUTRA Channel neighboring a 6 MHz Public Safety Band with a 2 MHz guard band (from −5 to −7 MHz in FIG. 3). The location of the 10 MHz EUTRA channel is shown in FIG. 3 from −5 MHz to 5 MHz with the Public Safety Band located at −7 MHz to −13 MHz with a 2 MHz guard band from −5 MHz to −7 MHz. The spectrum or power spectral density (PSD) due to a 1 Resource Block (RB) (consisting of 12 adjacent subcarriers with a subcarrier spacing of 15 kHz) transmission with maximum transmit power of 23 dBm located near the edge of the 10 MHz EUTRA channel that is closest to the Public Safety Band (e.g., transmission frequency near −4.5 MHz) is shown in FIG. 3. Transmission at the maximum power of 23 dBm corresponds to a Maximum Power Reduction (MPR) of 0 dB. A local oscillator (LO) carrier feed-through (DC component) of −30 dB and I/Q imbalance resulting in a I/Q image (located near +4.5 MHz) with power 30 dB below the desired transmit power is assumed. The 3rd order inter-modulation distortion spurious components between the desired spectral component (located near −4.5 MHz) and its I/Q image labeled "Image spurious" and between the desired spectral component and LO leakage or carrier feed-through labeled "I/Q spurious" are shown in FIG. 3. The PSD of the 3rd order inter-modulation distortion spurious components is a function of RB power and is reduced by 3 dB for each 1 dB increase in MPR. The Image spurious bandwidth is 3 times the desired RB allocation bandwidth which is ~0.5 MHz for the case of 1 RB allocation or 180 kHz bandwidth in FIG. 3. The LO or I/Q spurious bandwidth due to 3rd order inter-modulation is smaller. The location of the 3rd order inter-modulation distortion spurious components is a function of the allocation RB location with its position changing depending on the RB offset from the channel edge. It can be seen that the Image and I/Q spurious emissions are significant with no duplex filter. The −30 dBm/100 kHz (−20 dBm/1 MHz) spurious emissions does not meet the UE to UE co-existence target which is typically around −50 to −60 dBm/100 kHz. Even with a typical duplex filter, attenuation will only provide mitigation if spurious emission falls within RF filter stop band, which is typically located at a 6 MHz offset for 700 MHz carrier frequency. In FIG. 3, the duplex filter stopband, shown starting from −12 MHz, provides mitigation of the Image spurious emission only with possibly limited attenuation, if any, of the I/Q spurious emission component. Thus, significant interference to the adjacent Public Safety Band DL band (close geographical proximity between a (EUTRA UE) transmitter and a (PS NB) UE receiver) may occur, requiring techniques for interference reduction and control for neighboring operating bands in wireless communication systems.

The various aspects, features and advantages of the disclosure will become more fully apparent to those having ordinary skill in the art upon a careful consideration of the following Detailed Description thereof with the accompanying drawings described below. The drawings may have been simplified for clarity and are not necessarily drawn to scale.

BRIEF DESCRIPTION OF THE DRAWINGS

FIG. 8 is a table illustrating the relationship between control channel offset, maximum power reduction (MPR) and control channel resource allocation length.

DETAILED DESCRIPTION

Figure 1:
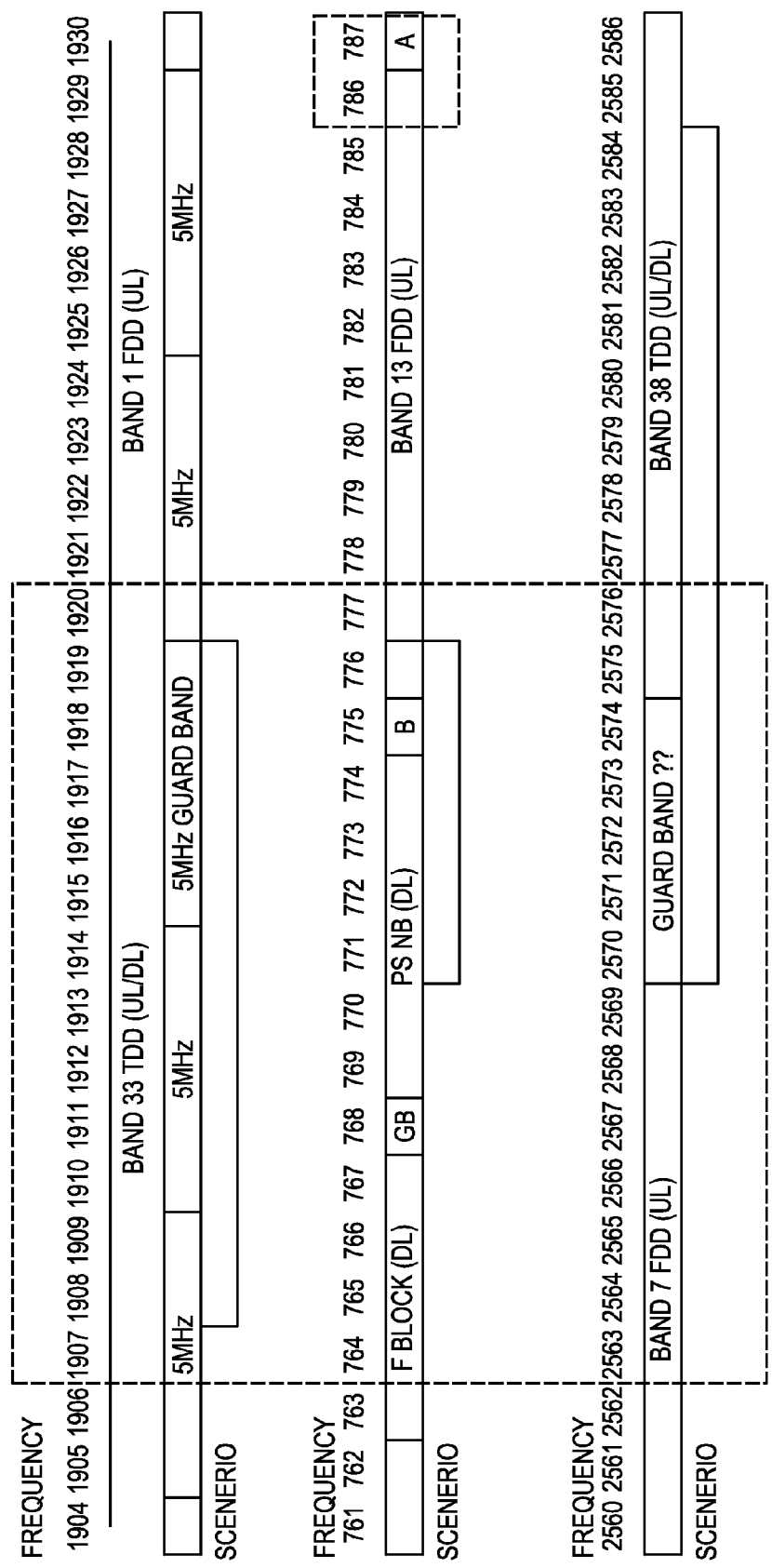
FIG. 1 illustrates neighboring frequency bands.
Figure 2:
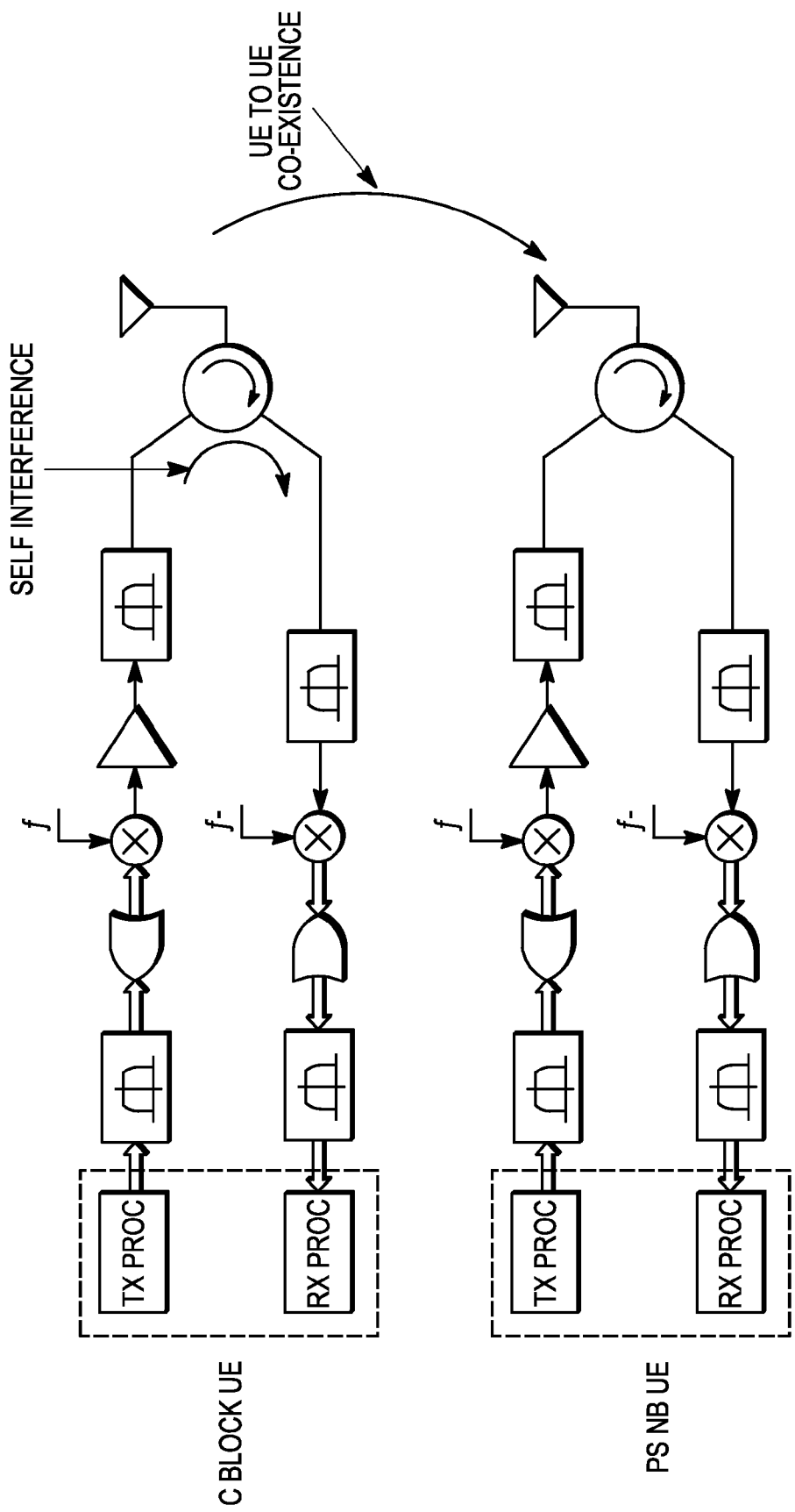
FIG. 2 illustrates interference between user terminals.
Figure 3:
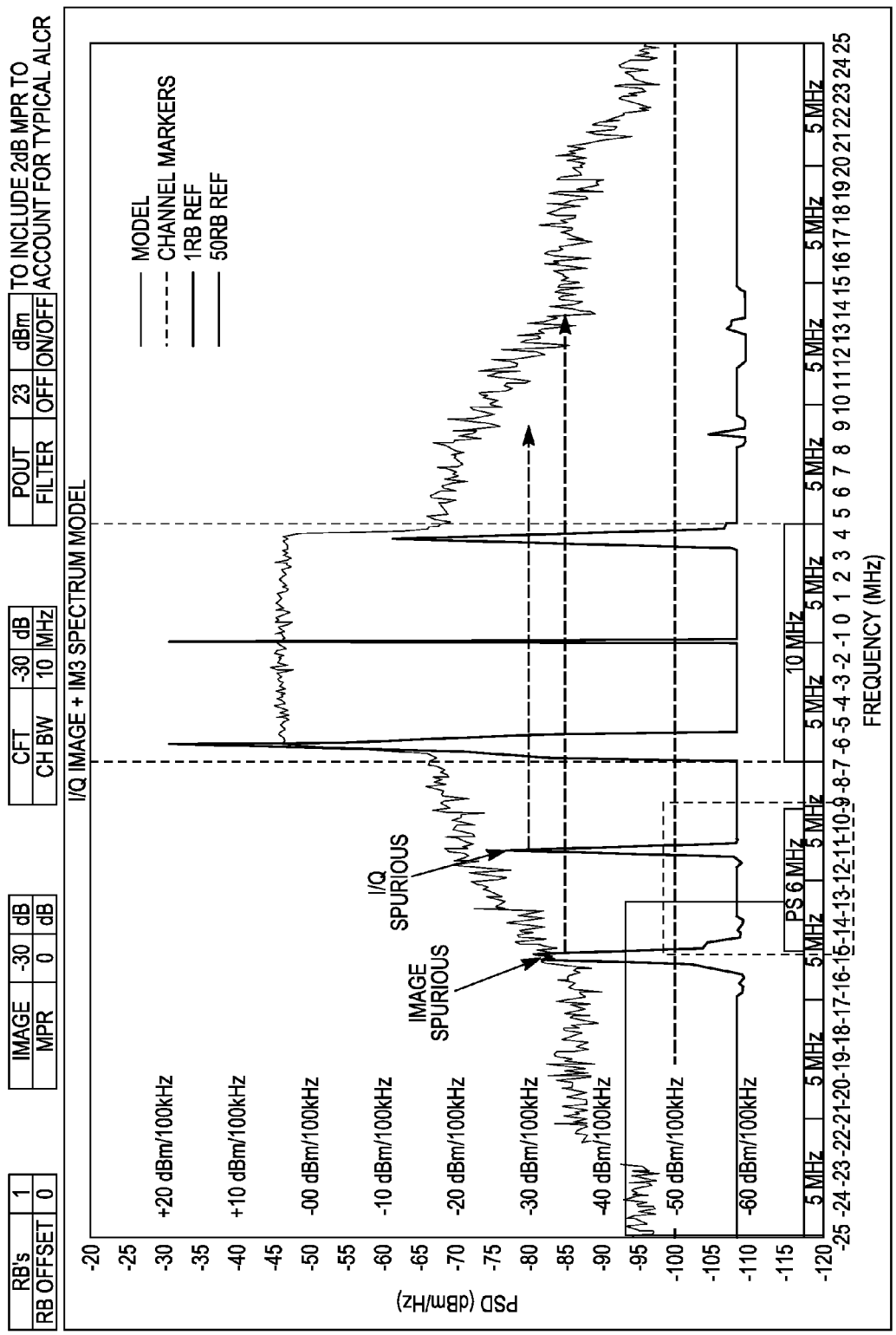
FIG. 3 illustrates neighboring frequencies, at least one of which is subject to interference.
Figure 4:
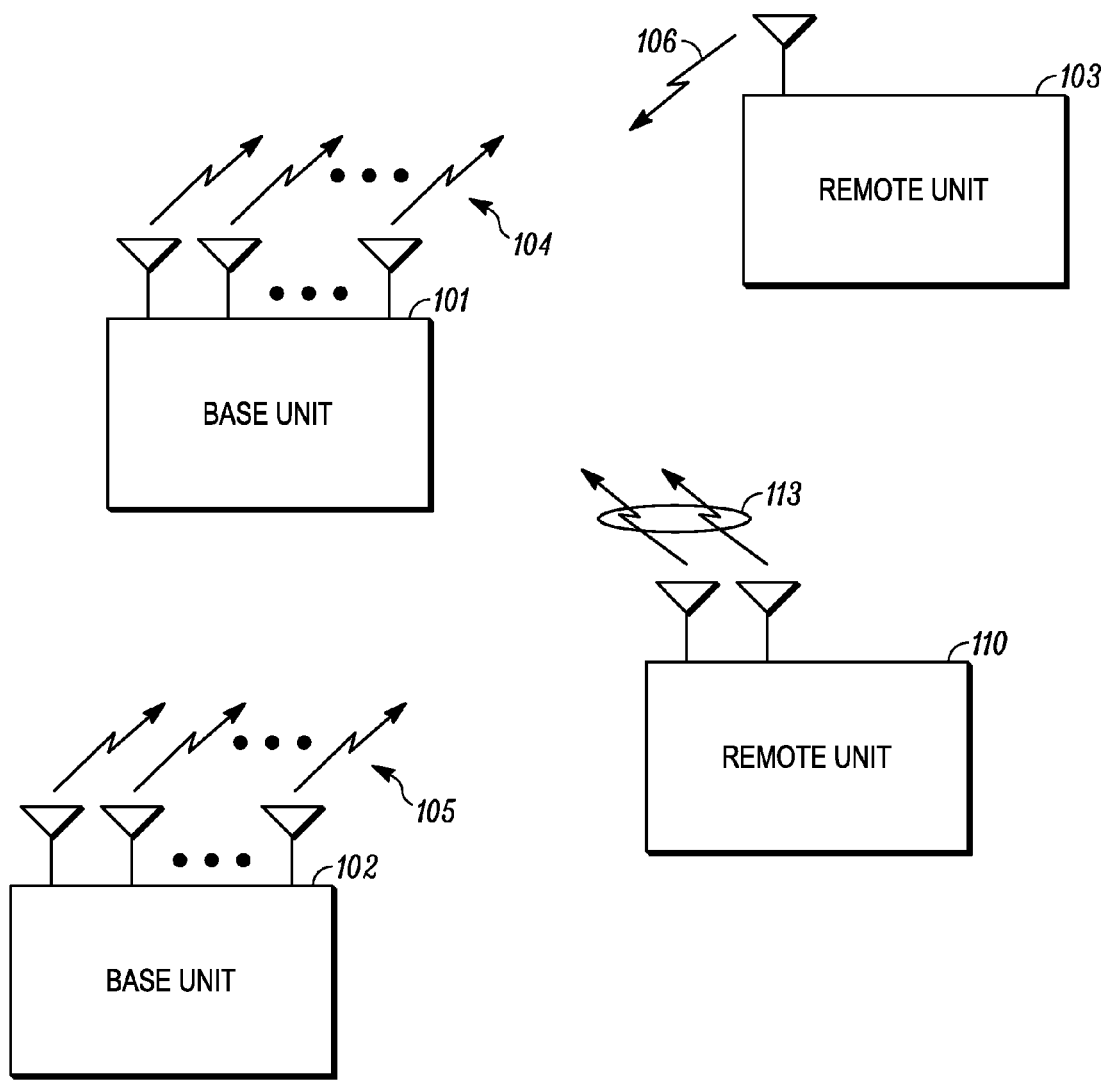
FIG. 4 illustrates a wireless communication system.

In FIG. 4, a wireless communication system 100 comprises one or more fixed base infrastructure units forming a network distributed over a geographical region. The base unit may also be referred to as an access point, access terminal, base, base station, Node-B, eNode-B, eNB or by other terminology used in the art. In FIG. 4, the one or more base units 101 and 102 serve a number of remote units 103 and 110 within a serving area, for example, a cell or a cell sector. The remote units may be fixed units or mobile terminals. The remote units may also be referred to as subscriber units, mobiles, mobile stations, users, terminals, subscriber stations, user equipment (UE), terminals, or by other terminology used in the art.

In FIG. 4, generally the base units 101 and 102 transmit downlink communication signals 104 and 105 to serve remote units in the time and/or frequency domain. The remote units 103 and 110 communicate with the one or more base units via uplink communication signals 106 and 113. The one or more base units may comprise one or more transmitters and one or more receivers for downlink and uplink transmissions. The remote units may also comprise one or more transmitters and one or more receivers. The base units are generally part of a radio access network that includes one or more controllers communicably coupled to one or more corresponding base units. The access network is generally communicably coupled to one or more core networks, which may be coupled to other networks, like the Internet and public switched telephone networks, among other networks. These and other elements of the access and core networks are not illustrated but they are well known generally by those having ordinary skill in the art.

In one implementation, the wireless communication system is compliant with the developing Long Term Evolution (LTE) of the 3GPP Universal Mobile Telecommunications System (UMTS) protocol (EUTRA) wherein the base station transmits using an orthogonal frequency division multiplexing (OFDM) modulation scheme on the downlink and the user terminals transmit on the uplink using a single carrier frequency division multiple access (SC-FDMA) scheme. More generally, however, the wireless communication system may implement some other open or proprietary communication protocol. The present disclosure is not intended to be limited to the implementation of any particular wireless communication system architecture or protocol. The system may also comprise more than one neighboring or overlapping systems each of which implements different wireless communication protocols, for example, EUTRA and a public safety communication protocol.

Figure 5:
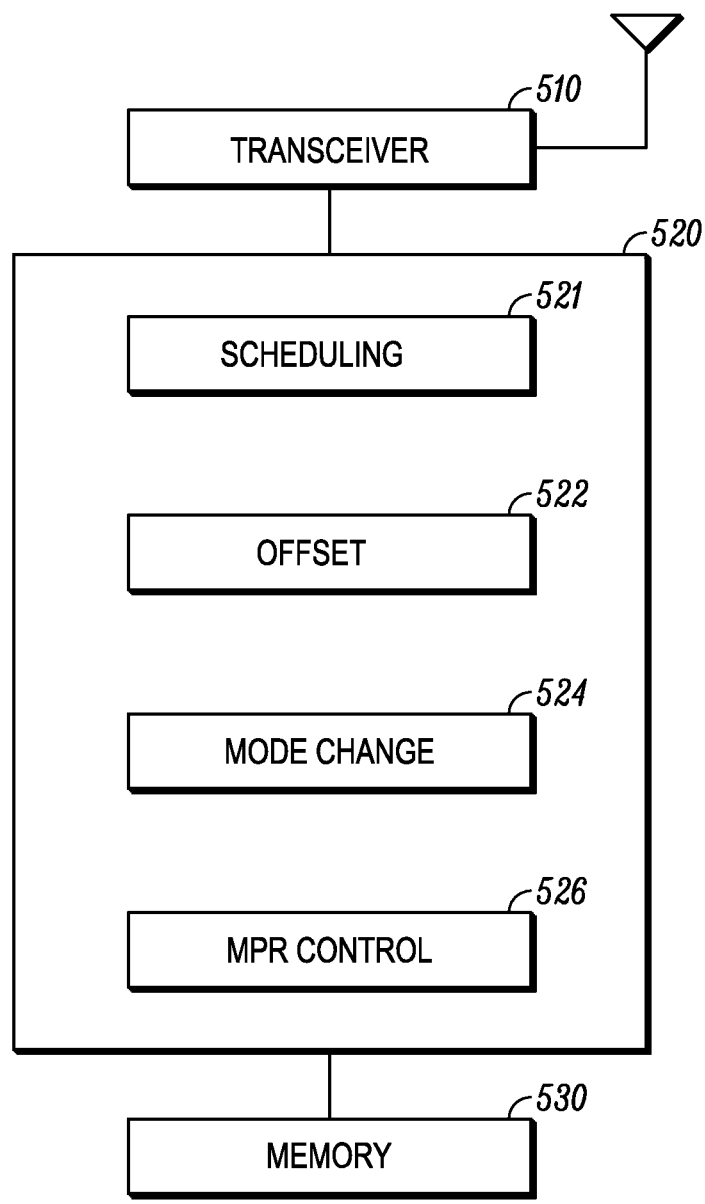
FIG. 5 illustrates a wireless communication infrastructure entity.

In FIG. 5, a wireless communication infrastructure entity 500 comprises a transceiver 510 communicably coupled a controller 520 for communicating with one or more user equipment within its coverage area. The controller is typically implemented as a digital processor controlled by software and/or firmware stored in memory 530. The controller is thus configured by the software/firmware to perform various functions. Alternatively, however the controller may be implemented as a hardware equivalent device or as a combination of hardware and software. The base unit includes scheduler functionality 521 for allocating resources to the UE as discussed more fully below. In one embodiment, the wireless communication infrastructure entity corresponds to one of the base units of FIG. 4.

In some systems, for example, EUTRA protocol systems, the base unit performs scheduling functions, which includes the allocation of time and/or frequency resources for data and control communications. In EUTRA systems, the scheduler allocates an uplink control channel to one or more UE for communicating hybrid ARQ feedback (ACK/NACK), channel quality feedback (CQI), rank indicator (RI), precoding matrix indicator (PMI) among other information. In other systems other control information may be communicated on the uplink control channel. In EUTRA systems, the uplink control information is communicated on a physical uplink channel (PUCCH). More generally uplink control information may be communicated on some other channel. In EUTRA, for example, control information may also be communicated on the physical uplink shared channel (PUSCH). In EUTRA, the PUCCH and PUSCH accommodate simultaneous uplink transmissions by multiple user equipment communicating in the wireless communication system. In EUTRA, such simultaneous communication is implemented by orthogonal coding of the uplink communications transmitted by the UE.

The PUCCH is implemented using a narrowband frequency resource within a wideband frequency resource wherein the PUCCH includes a pair of uplink control channels separated within the wideband frequency resource. The PUSCH may be configured similarly. Other uplink control channels used in other wireless protocols may be configured similarly. Locating the pair of uplink control channels at or near opposite edges of a wideband frequency resource provides diversity and avoids fragmentation of the resource block allocation space. Reducing fragmentation of this space permits allocation of contiguous resource blocks to a single UE to support relatively high data rates. In some implementations, diversity is achieved by alternately assigning a UE to one of the control channels at opposite edges of the band on a frame by frame basis.

According to one aspect of the disclosure, to reduce out of band interference, the uplink control channel near edges of the wideband frequency resource may be relocated away from the edge and toward a medial portion of the band and/or a power limitation may be imposed on a UE transmitting on the uplink control channel. The relocation of the control channel may be static, semi-static (i.e., adjusted periodically) or it may be performed dynamically, for example, on a UE basis. The transmit power limitation, for example, maximum power reduction (MPR), imposed on a UE transmitting on the uplink control channel is generally conditioned on the narrowband frequency resource (e.g., frequency and bandwidth) allocated for the uplink control channel. The interference may result from a UE transmitting at a high power which commonly occurs at or near the cell edge, though channel conditions away from the cell edge may also elicit higher transmit power. The interference may thus be exacerbated by relatively large cells. These and other schemes for offsetting the uplink control channel are discussed further below.

Figure 6:
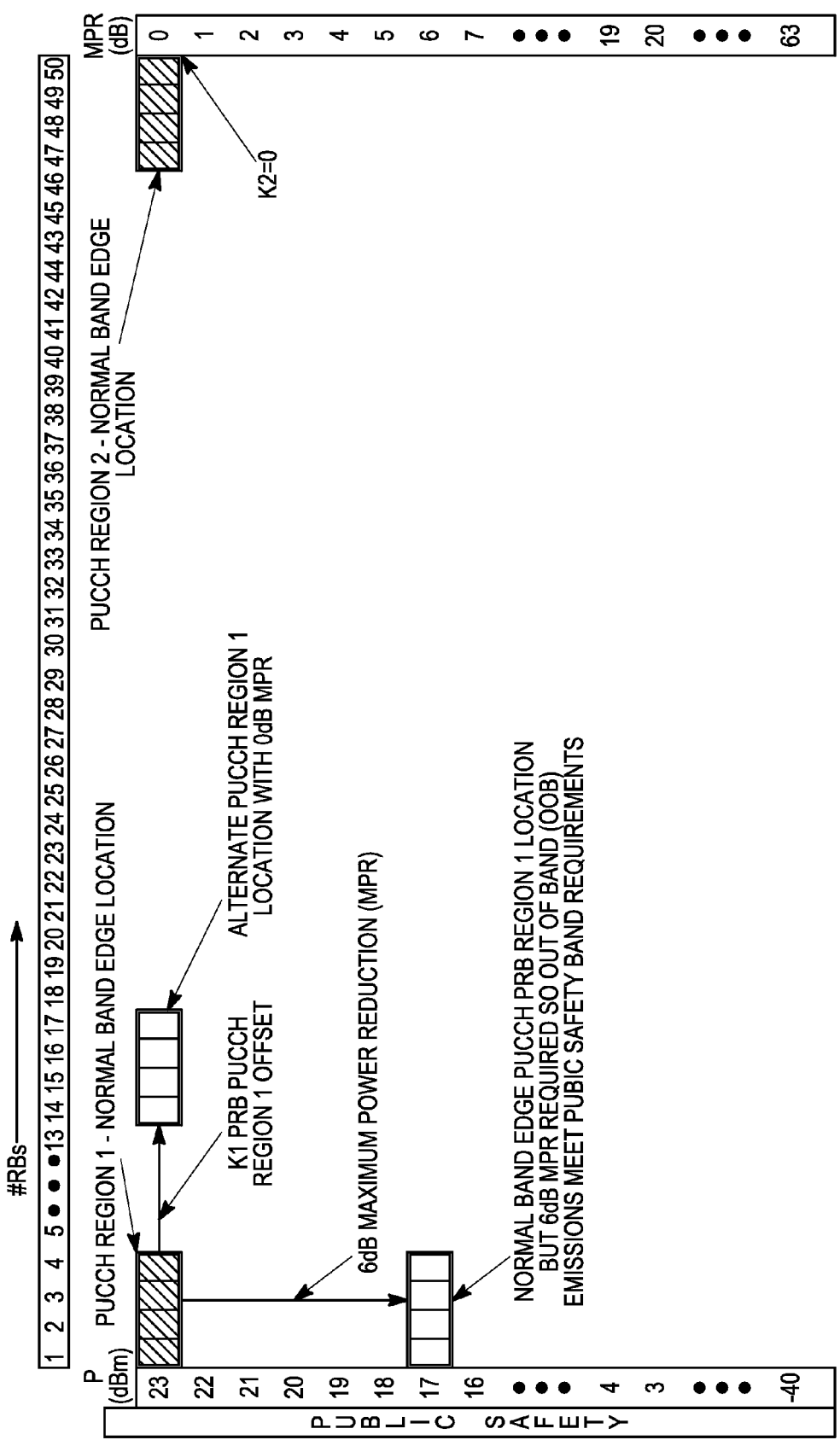
FIG. 6 illustrates a first exemplary uplink control channel offset.

FIG. 6 illustrates a pair of uplink control channels (PUCCH region 1 and region 2) located at opposite edges of the band, which is the location specified for the PUCCH under the current EUTRA specification. Assume, for illustration purposes, that the first four (4) physical resource blocks (PRBs) of PUCCH region 1 cannot achieve maximum power without interfering with a neighboring band, for example, the public safety band as illustrated in FIG. 6. To reduce this interference, the PUCCH region 1 may be offset away from the band edge towards a medial portion of the band. In FIG. 6, PUCCH region 1 is offset to an alternate PUCCH region 1 location sufficiently far that there is no transmit power limitation imposed on the UE (0 dBm MPR). PUCCH region 2 is not offset under the assumption that it does not interfere with any neighboring bands. But more generally, PUCCH region 2 may also be offset toward the medial portion of the band. The offsets for PUCCH regions 1 and 2 may be the same or different.

Figure 7:
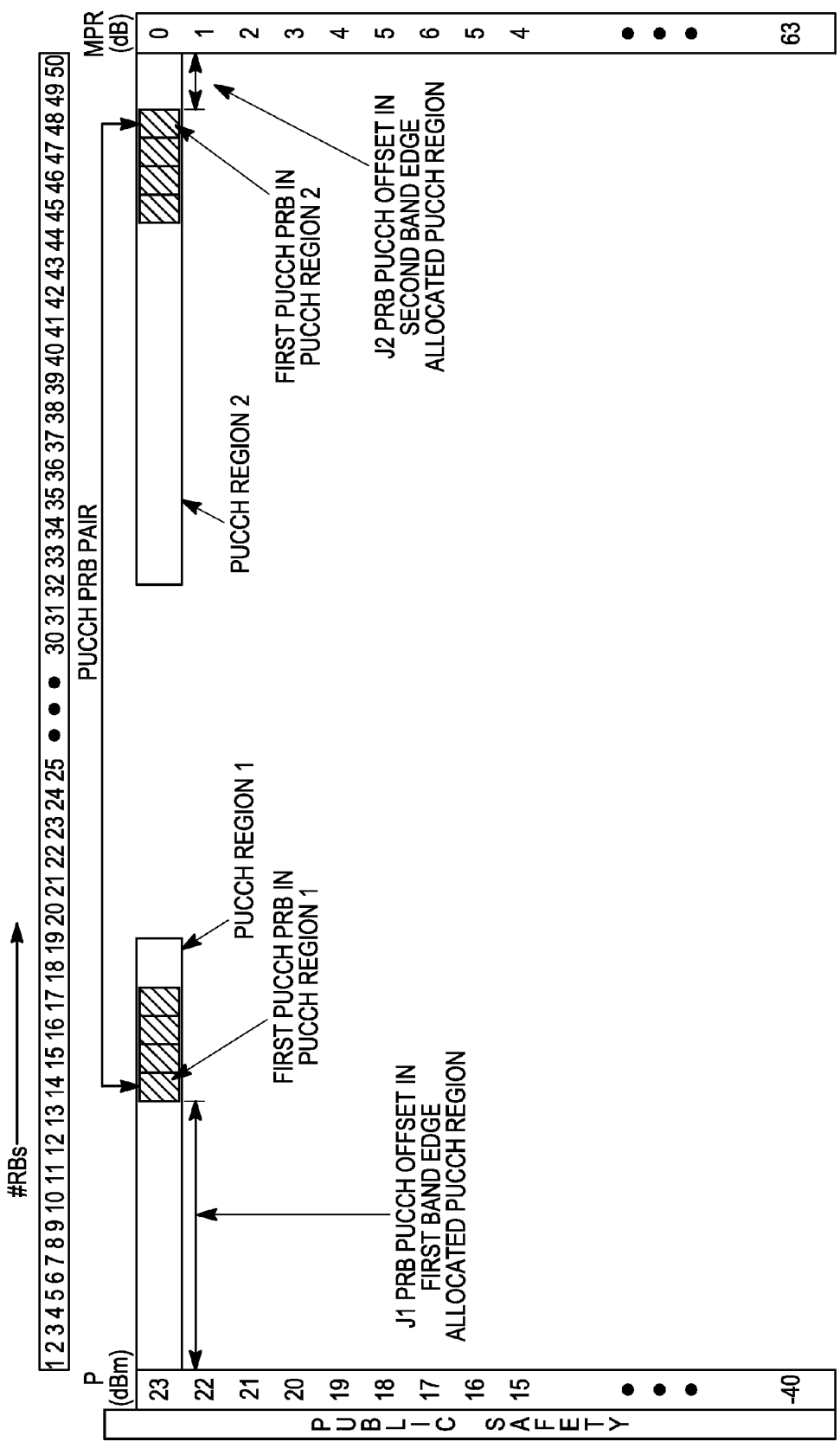
FIG. 7 illustrates a second exemplary uplink control channel offset.

In one embodiment, the uplink control channel offset is specified in terms of the number of resource blocks that the entire resource region of the PUCCH is offset. In EUTRA, the resource region is specified in terms of system variables including the number of UEs, traffic per UE, etc. and is computed by the network. Thus in FIG. 6, the entire PUCCH region 1 is offset 13 resource blocks. In an alternative embodiment, the uplink control channel offset is specified in terms of the number of resource blocks within the resource region of the PUCCH that the assignment or allocation of control channel resources begins. In FIG. 7, for example, PUCCH regions 1 and 2 include approximately 18 resource blocks in comparison to the 4 resource blocks associated with the PUCCH regions 1 and 2 in FIG. 6. Thus in FIG. 7, the control channel assignments may be made in any resource block within regions 1 and 2. According to this alternative embodiment, the offset indicates where within the region the assignment of control channel resources begins. For example, in FIG. 7, the first assigned control channel resource in region 1 is PRB 14. According to another alternative embodiment, the offset corresponds to a PUCCH number offset. Each UE is assigned a PUCCH which occurs in a PRB in each PUCCH region (PUCCH region 1 and 2 as shown in FIG. 7) denoted as a PUCCH PRB pair as shown in FIG. 7. Each PUCCH PRB pair can support some maximum number of PUCCH depending on the particular PUCCH format supported in the PUCCH PRB pair. The PUCCH numbering starts on the first PUCCH PRB in a PUCCH region. A PUCCH PRB may have up to 12 or 18 PUCCHs depending on the PUCCH format supported such that the first PUCCH PRB would have, for example, PUCCH #1 to #18. The PUCCH numbering proceeds with each subsequent PUCCH PRB in a PUCCH region.

In FIG. 7, the PUCCH region can have more PUCCH PRBs than the actual number of PUCCH PRBs assigned the PUCCH. This is referred to as over-provisioning. In this case the lowest channel number used for UE PUCCH assignments, i.e., a UE with persistently scheduled PUCCH assignments, might skip the first J11 channels in the PUCCH region and start at a channel number corresponding to a PRB occurring further into the PUCCH region and thereby skipping the first K11 PRBs in the PUCCH region. Given each PUCCH PRB pair supported 18 PUCCHs then, for example, with the only PUCCH numbers assigned being >J11 where J11=K11×18 means that each PUCCH corresponding to its assigned PUCCH number would occur in PRB number K11+1 or greater in the PUCCH region. Given the PUCCH regions are the same size in terms of PRBs and use the same PUCCH numbering scheme then a UE assigned a PUCCH number can determine which PRB in either PUCCH region its PUCCH resides in. In one embodiment, a different PUCCH number offset is used in each PUCCH region such that the PUCCH can map to arbitrary sets of PRBs in each PRB region from which PUCCH PRB pairs are formed as shown in FIG. 7. For example, in PUCCH region 1 the PUCCH number i1 is given by i1=j+J1*NPUCCH_PER_PRB with PUCCH number offset J1*NPUCCH_PER_PRB and in PUCCH region 2 by i2=j+J2*NPUCCH_PER_PRB with PUCCH number offset J2*NPUCCH_PER_PRB. Note that j ranges from 0 to maximum_PUCCH_channel_number −1.

In an alternative embodiment, J1 gives the PRB offset relative to the edge PRB of the PUCCH region 1 to the PRB in PUCCH region 1 where PUCCH numbering starts which in this example is labeled as the first PRB in PUCCH region 1 and J2 given the PRB offset relative to the edge PRB of the PUCCH region 2 to the PRB in PUCCH region 2 where PUCCH numbering starts which in this example is labeled as the first PRB in PUCCH region 2.

In most or all such embodiments that permit offsetting of the PUCCH resource, including the case of over-provisioning, the network is enabled to initiate uplink data transmission in frequency resources not used by PUCCH transmissions.

Also, while in the descriptions of the embodiments the offset is generally defined with respect to the edge of the band, other offsets, such as with respect to another arbitrary reference such as the center or any other predefined reference, may be used and are functionally equivalent.

In another embodiment, the uplink control channel also includes a third uplink control channel, which is located within the wideband frequency resource between the pair of outmost uplink control channels. In FIG. 6, the third control channel resource could be located in a resource block region between PUCCH regions 1 and 2 away from the neighboring band subject to the interference. The use of a third control channel resource between the pair of control channel resources provides the scheduler the flexibility to assign the third control channel to UE transmitting at higher power, or meeting some other criteria such as excessive out of bands emissions, if desired.

According to another embodiment, the location of the uplink control channel may be changed by changing the uplink control channel feedback mode. In EUTRA systems, for example, the feedback mode may be changed from PUCCH feedback mode to PUSCH feedback mode. In other words feedback information normally communicated on the PUCCH could be communicated on the PUSCH. The mode change may be triggered based on various conditions. For example, a change from PUCCH feedback mode to PUSCH feedback mode may be triggered when CQI reports sent on the PUCCH indicate that CQI has dropped below a specified threshold or when an estimated transmit power level of the UE rises above a threshold, among other conditions. In one implementation, the UE is signaled to discontinue use of PUCCH resources used for reporting CQI, PMI, and RI and to instead use MPR+RBA map when scheduling CQI/PMI/RI on assigned PUSCH resources that do not adversely impact the neighboring band. In another embodiment a UE continues to report CQI on the PUCCH but at a reduced transmission power on the PUCCH PRBs adjacent to the public safety band when CQI reports sent on the PUCCH indicate that CQI has dropped below a specified threshold or when an estimated transmit power level of the UE rises above a threshold. When this occurs the UE will also be scheduled to report CQI/PMI/RI on the PUSCH where the PUCCH and PUSCH feedback transmissions can subsequently be soft combined.

A transmission power reduction may also be imposed on the UE to prevent or reduce out of band interference. In FIG. 6, for example, a 6 dBm maximum power reduction (MPR) is shown to be required to sufficiently reduce out of band emissions interference on the public safety band. In this instance, the control channel is not offset. MPR imposed on UE transmitting on the uplink control channel is generally conditioned on frequency and bandwidth allocated for the uplink control channel. The table in FIG. 8 illustrates an exemplary relationship. Particularly, the table illustrates the minimum offset, in resource blocks (PRBs), for a particular allocation length (PRBs) and the corresponding maximum power reduction (MPR). For example, for a control channel length between 11-30 PRBs, the minimum offset is 14 PRBs with a 20 MPR. In one implementation, the MPR is enabled and disabled using a bit field in a system information block (SIB) message.

The wireless communication infrastructure entity, for example, a EUTRA base station, in a wireless communication system implementing an uplink control channel using a narrowband frequency resource within a wideband frequency resource communicates a change of location for an uplink control channel within the wideband frequency resource to one or more UE. In FIG. 5, for example, offset signaling functionality 522 configures the controller to cause the transceiver 510 to signal, to user equipment that communicates with the wireless communication infrastructure entity, the change of location for the uplink control channel within the wideband frequency resource. As suggested, the change of location of the control channel may be signaled by indicating an offset in terms of physical resource blocks for one or both pair of scheduled uplink control channels relative to a reference location. In one embodiment, the reference location is known a priori by the UE. For example, the reference location may be the default PUCCH location specified by the EUTRA protocol specification. Alternatively, the reference location may be provided in the signaling.

Generally, the offset must be communicated in a manner consistent with how the offset is defined, as discussed above. For example, where a third control channel resource between the pair of control channel resources is employed, the UE may be signaled or assigned to use the third control channel or the third control channel and only one of the pairs of control channel resources. The third control channel provides the scheduler the flexibility to assign the third control channel to UE transmitting at higher power. For example, the scheduler may assign high power user equipment to the third uplink control channel and one of the pair of uplink control channels and assign relatively low power user equipment to the pair of control channels near the band edges. In FIG. 5, the scheduler 521 may perform this function. In FIG. 5, the controller also includes mode change functionality 524 to cause the transceiver to signal the change in location of the control channel as a change between PUCCH feedback mode and PUSCH feedback mode. The controller also includes power reduction control functionality for determining the power control, for example, MPR, based on the control channel allocation as discussed above. These and other functions of the base station described herein are thus performed by a software/firmware based controller.

In an alternative implementation, the user terminal is configured to offset at least one of the pair of narrowband uplink control channels when tuning to a narrowband uplink control channel within a different wideband frequency resource in the absence of signaling from the network indicating a change of location of the uplink control channel. Thus for example, a wireless communication user terminal comprises a controller communicably coupled to a transceiver, wherein the controller is configured to tune the transceiver to transmit on an narrowband uplink control channel within a wideband frequency resource and to offset at least one of the pair of narrowband uplink control channels when tuning to a narrowband uplink control channel within a different wideband frequency resource. In one implementation, the wireless communication user terminal is a EUTRA UE, the uplink control channel is a PUCCH, and the controller is configured to offset at least one of the pair of narrowband uplink control channels when tuning to uplink control channel Band 13 specified by EUTRA.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:
1. A wireless communication infrastructure entity in a wireless communication system implementing an uplink control channel using a narrowband frequency resource within a wideband frequency resource, the entity comprising:
a wireless transceiver;
a controller communicably coupled to the transceiver,
the controller configured to cause the transceiver to signal, to user equipment that communicates with the wireless communication infrastructure entity, an uplink control channel offset in terms of resource blocks for the uplink control channel within the wideband frequency resource,
the uplink control channel includes at least a pair of uplink control channels separated within the wideband frequency resource, each of the uplink control channels located within an overprovisioned corresponding PUCCH resource region, each of the overprovisioned corresponding PUCCH resource regions specified in terms of resource blocks,
the uplink control channel accommodating simultaneous uplink transmissions by multiple user equipment communicating in the wireless communication system,
wherein allocation of a plurality of control channel resources the begins at a specified resource block according to the uplink control channel offset within at least one of the overprovisioned corresponding PUCCH resource regions, away from an edge of the wideband frequency resource.

2. The entity of claim 1, the controller configured to cause the transceiver to signal the uplink control channel offset for at least one of the uplink control channels relative to a reference location.

3. The entity of claim 1, the uplink control channel is a PUCCH located within the overprovisioned PUCCH resource regions.

4. The entity of claim 1, the controller configured to cause the transceiver to signal, to user equipment that communicates with the wireless communication infrastructure entity, a transmit power limitation for at least one of the uplink control channels conditioned on a narrowband frequency resource allocated for at least one of the uplink control channels.

5. The entity of claim 4, the controller configured to cause the transceiver to signal the transmit power limitation by enabling or disabling the transmit power limitation using a bit field in a system information block message.

6. A wireless communication user terminal for communicating in a wireless communication system, the terminal comprising:
a wireless transceiver;
a controller communicably coupled to the transceiver,
the controller configured to tune the transceiver to transmit on a narrowband uplink control channel within a wideband frequency resource,
the uplink control channel includes at least a pair of uplink control channels separated within the wideband frequency resource, each of the uplink control channels located within an overprovisioned corresponding PUCCH resource region, each of the overprovisioned corresponding PUCCH resource regions specified in terms of resource blocks,
the uplink control channel accommodating simultaneous uplink transmissions by multiple user terminals communicating in the wireless communication system,
the controller configured to begin allocation of a plurality of control channel resources at a specified resource block within at least one of the overprovisioned corresponding PUCCH resource regions, away from an edge of the wideband frequency resource.

7. The terminal of claim 6,
the wireless communication user terminal is a EUTRA user equipment,
the uplink control channel is a PUCCH,
the controller configured to begin allocation of the plurality of control channel resources when tuning to uplink control channel Band 13 specified by EUTRA.

8. The terminal of claim 6, the controller configured to begin allocation of the plurality of control channel resources when tuning to a narrowband uplink control channel within a different wideband frequency resource, in the absence of receipt of signaling from a base station of the wireless communication system indicating the allocation of the plurality of control channel resources.

9. The terminal of claim 6, the controller configured to begin allocation of the plurality of control channel resources in response to receipt of a signal including an uplink control channel offset, wherein allocation of the plurality of control channel resources begins at a specified resource block according to the uplink control channel offset within the at least one of the overprovisioned corresponding PUCCH resource regions, away from an edge of the wideband frequency resource.

10. The terminal of claim 6, the uplink control channel is a PUCCH.

* * * * *